(12) United States Patent
Song

(10) Patent No.: US 12,485,954 B2
(45) Date of Patent: Dec. 2, 2025

(54) DAMPER AND DRIVING UNIT OF STEERING DEVICE HAVING THE SAME

(71) Applicant: HL MANDO CORPORATION, Pyeongtaek (KR)

(72) Inventor: Seokki Song, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 644 days.

(21) Appl. No.: 17/822,810

(22) Filed: Aug. 29, 2022

(65) Prior Publication Data

US 2023/0083228 A1 Mar. 16, 2023

(30) Foreign Application Priority Data

Sep. 7, 2021 (KR) .................. 10-2021-0119349

(51) Int. Cl.
*B62D 5/04* (2006.01)
*F16H 57/12* (2006.01)

(52) U.S. Cl.
CPC ........... *B62D 5/0403* (2013.01); *F16H 57/12* (2013.01)

(58) Field of Classification Search
CPC .............................. B62D 5/0403; F16H 57/12
See application file for complete search history.

(56) References Cited

U.S. PATENT DOCUMENTS

| 9,777,776 | B2* | 10/2017 | Kogure | ............... B62D 5/0421 |
| 2007/0158131 | A1* | 7/2007 | Iwasa | ..................... F16C 27/04 |
| | | | | 180/444 |
| 2019/0353238 | A1* | 11/2019 | Kim | ......................... F16H 1/16 |
| 2020/0070884 | A1* | 3/2020 | Kim | ......................... F16F 15/12 |
| 2020/0116249 | A1* | 4/2020 | Cho | ..................... B62D 5/0454 |

FOREIGN PATENT DOCUMENTS

JP 2013144490 A * 7/2013

* cited by examiner

*Primary Examiner* — Jacob D Knutson
(74) *Attorney, Agent, or Firm* — Harvest IP Law, LLP

(57) ABSTRACT

An embodiment of the present invention relates to a damper installed in a driving unit of a steering device, and a damper which is installed in a driving unit of a steering device to buffer an impact of a worm shaft including a worm gear formed in one region and a bearing supporting a rotation of the worm shaft, including a first body including a first through hole formed therein through which the worm shaft passes, a second body coupled to the first body and including a second through hole through which the worm shaft passing through the first through hole passes, and a buffer member disposed between the first body and the second body.

17 Claims, 4 Drawing Sheets

DAMPER AND DRIVING UNIT OF STEERING DEVICE HAVING THE SAME

CROSS REFERENCE TO RELATED APPLICATION

The present application claims priority to Korean Patent Application No. 10-2021-0119349, filed Sep. 7, 2021, the entire contents of which is incorporated herein for all purposes by this reference.

BACKGROUND OF THE INVENTION

Field of the Invention

An embodiment of the present invention relates to a damper and a driving unit of a steering device including the same, and more particularly, a damper which is installed in a driving unit of a steering device, is easy to be manufactured, and is capable of effectively buffering an impact in the axial direction of a worm shaft, and a driving unit of a steering device having the damper.

Description of the Related Art

In general, the damper installed in the driving unit of a steering device is made by manufacturing a washer and integrally combining the washer and a buffer member using an insert injection method of the buffer member. In this case, a separate manufacturing process and mold are required so that insert molding can be performed on the injection mold of the buffer member.

In addition, when the damper is manufactured using the above-described process, there is a problem in that a separate mold must be manufactured if a volume of the mold of the buffer member is changed since the volume in which the mold of the buffer member fits is constant. That is, if the thickness and shape of the buffer member are changed, a separate mold is required to manufacture the damper using the same.

In addition, even when the size of a bearing is changed, there is a problem in that a mold for the washer and the insert molding is newly required.

SUMMARY OF THE INVENTION

An embodiment of the present invention provides a damper that is easy to be manufactured and can effectively buffer an impact in the axial direction of a worm shaft, and a driving unit of a steering device including the same.

According to an embodiment of the present invention, a damper which is installed in a driving unit of a steering device to buffer an impact of a worm shaft including a worm gear formed in one region and a bearing supporting a rotation of the worm shaft, includes a first body including a first through hole formed therein through which the worm shaft passes, a second body coupled to the first body and including a second through hole through which the worm shaft passing through the first through hole passes, and a buffer member disposed between the first body and the second body.

In addition, the damper may include a coupling portion including a first locking portion protruding toward the buffer member on the first body and a second locking portion formed on the second body to engage the first locking portion.

In addition, the first locking portion may include a first support member protruding toward the buffer member in a direction parallel to a central axis of the first through hole, and a first protrusion in which a region on the first support member protrudes toward a center of the first through hole.

In addition, the first locking portion may further include a first inclined portion formed to be inclined between one end of the first support member and the first protrusion.

In addition, the second locking portion may include a second support member protruding toward the buffer member in a direction parallel to a central axis of the second through hole, and a second protrusion in which a region on the second support member protrudes in a direction away from a center of the second through hole and which is engageable with the first protrusion.

In addition, the second locking portion may further include a second inclined portion formed to be inclined between one end of the second support member and the second protrusion.

In addition, one end of the first support member may be spaced apart from the second body in a center direction of the first through hole.

In addition, a length of the buffer member in a direction parallel to a longitudinal direction of the worm shaft may be formed to be relatively longer than a length of the first support member from the first body in a direction parallel to a center direction of the first through hole.

In addition, an outer diameter of the second body may be formed to be relatively smaller than an outer diameter of the first body.

In addition, according to an embodiment of the present invention, a driving unit of a steering device which provides an auxiliary torque of the steering device and includes a housing of the driving unit including an installation region formed therein, includes a worm shaft disposed in the installation region and including a worm gear formed in one region, a bearing rotatably supporting one side of the worm shaft, and a damper including a first body including a first through hole formed therein so that the worm shaft passes through, a second body including a second through hole formed so that the worm shaft passing through the first through hole passes through, a buffer member disposed between the first body and the second body, and a coupling portion coupling the first body, the buffer member, and the second body to each other.

In addition, the coupling portion may include a first locking portion including a first support member protruding toward the buffer member in a direction parallel to a central axis of the first through hole, and a first protrusion in which a region on the first support member protrudes toward a center of the first through hole, and a second locking portion including a second support member protruding toward the buffer member in a direction parallel to a central axis of the second through hole, and a second protrusion in which a region on the second support member protrudes in a direction away from a center of the second through hole and which is engageable with the first protrusion.

In addition, the coupling portion may be disposed so that an inner peripheral surface of the buffer member faces an outer periphery of the first support member.

In addition, a plurality of the first support members may be disposed on the first body to be spaced apart from each other about the first through hole.

In addition, a plurality of the second support members may be disposed on the second body to be spaced apart from each other around the second through hole.

In addition, in the coupling portion, the second protrusion may be caught and engaged with the first locking portion in a direction parallel to a center of the first through hole.

In addition, the coupling portion may maintain the coupling between the first body, the second body, and the buffer member even if the buffer member is varied in a direction parallel to a longitudinal direction of an axial direction of the worm shaft.

According to an embodiment of the present invention, since the damper and the driving unit of a steering device including the same do not require an insert molding process compared to the conventional art, the manufacturing process and the cost thereof can be reduced. In addition, according to an embodiment of the present invention, the damper and the driving unit of a steering device including the same can easily respond to changes in the shape of the buffer member and the size of the bearing to effectively prevent noise and impact.

DETAILED DESCRIPTION OF THE INVENTION

Figure 1:
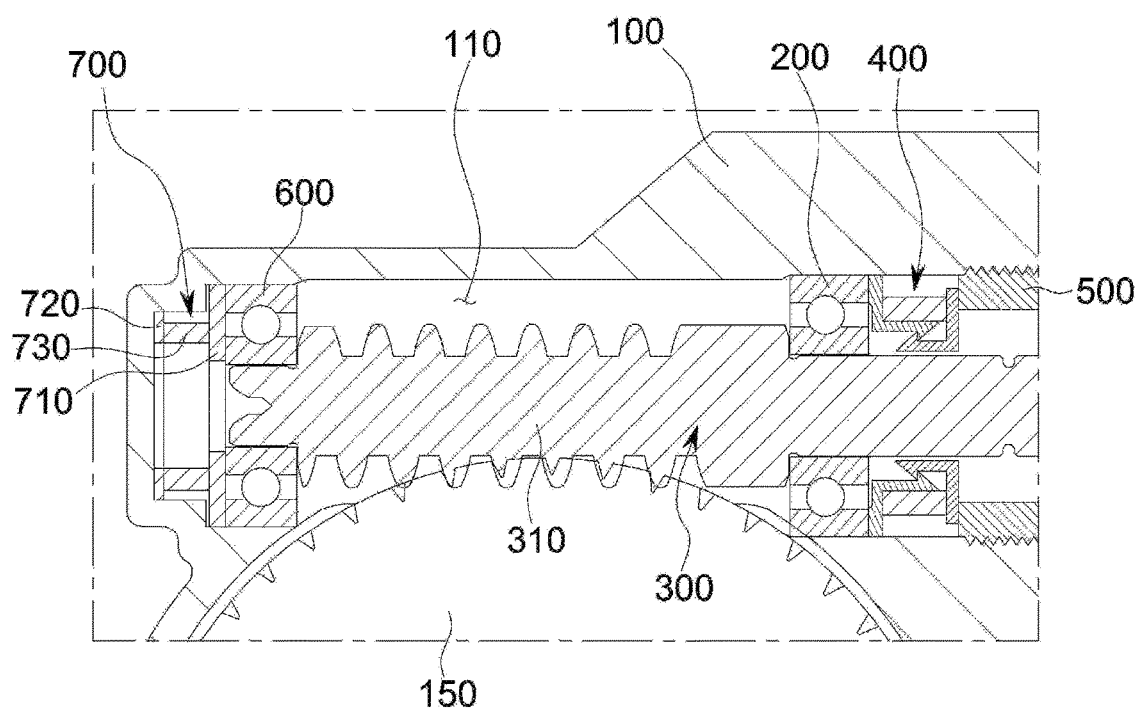
FIG. 1 shows a cross-section of a driving unit of a steering device in which a damper according to an embodiment of the present invention is installed.

Hereinafter, with reference to the accompanying drawings, the embodiments of the present invention will be described in detail so that those of ordinary skill in the art to which the present invention pertains can easily implement them. The present invention may be embodied in many different forms and is not limited to the embodiments described herein.

It is noted that the drawings are schematic and not drawn to scale. Relative dimensions and proportions of parts in the drawings are shown exaggerated or reduced in size for clarity and convenience in the drawings, and any dimensions are illustrative only and not limiting. Further, the same reference numerals are used to indicate like features to the same structural element or part appearing in two or more drawings.

The embodiment of the present invention specifically represents an ideal embodiment of the present invention. As a result, various modifications of the diagram are expected. Therefore, the embodiment is not limited to a specific shape of the illustrated area, and includes, for example, a shape modification by manufacturing.

Hereinafter, a damper 400 according to an embodiment of the present invention will be described. The damper 400 is installed in a driving unit 101 of a steering device of a vehicle to buffer the impact in the longitudinal direction of a worm shaft 300 of a bearing 200 supporting the rotation of the worm shaft 300.

As shown in FIGS. 1 to 4, the damper 400 according to an embodiment of the present invention includes a first body 410, a second body 420, and a buffer member 430.

The first body 410 includes a first through hole 411 formed therein. In addition, the first through hole 411 is formed so that the worm shaft 300 passes therethrough. In addition, the first body 410 may be formed in an annular shape having the first through hole 411 formed therein.

The second body 420 includes a second through hole 421 formed therein. In addition, the second through hole 421 is formed so that the worm shaft 300 penetrating the first body 410 passes therethrough. In addition, the second body 420 may be formed in an annular shape having the second through hole 421 formed therein. The second body 420 is coupled to the first body 410.

The buffer member 430 is disposed between the first body 410 and the second body 420. Specifically, the buffer member 430 may be formed in an annular shape, so that both sides of the buffer member 430 may be disposed between the first body 410 and the second body 420. In addition, the buffer member 430 is formed to include an elastic material, and varies according to the impact in the axial direction of the worm shaft 300 to buffer the impact.

Accordingly, in the damper 400 according to an embodiment of the present invention, since the first body 410 and the second body 420 are coupled, the buffer member 430 disposed therebetween can effectively buffer the impact of the worm shaft 300 and the bearing 200 without being separated from the first body 410 and the second body 420.

Figure 2:
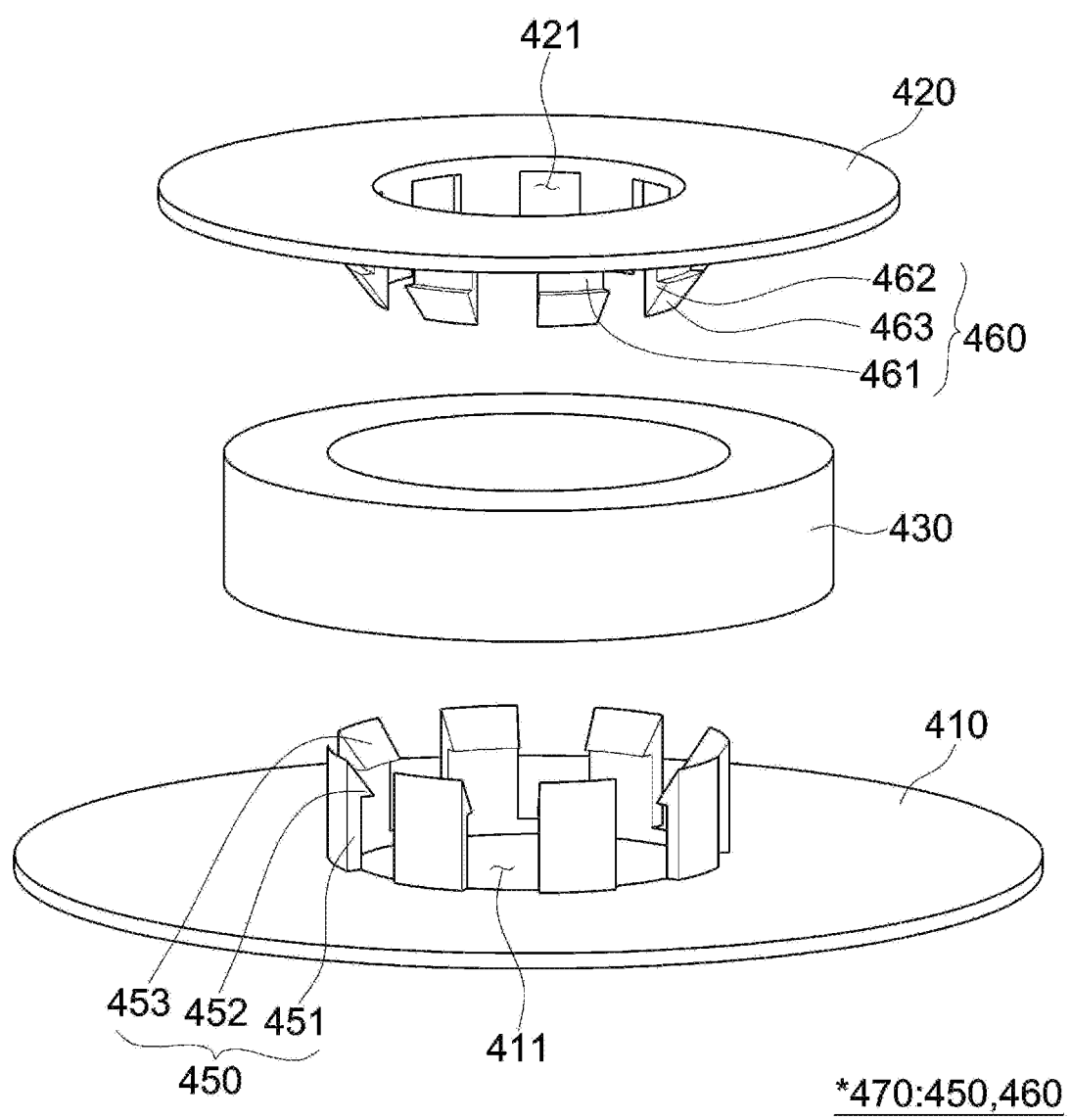
FIG. 2 shows an assembly view of the damper of FIG. 1.
Figure 3:
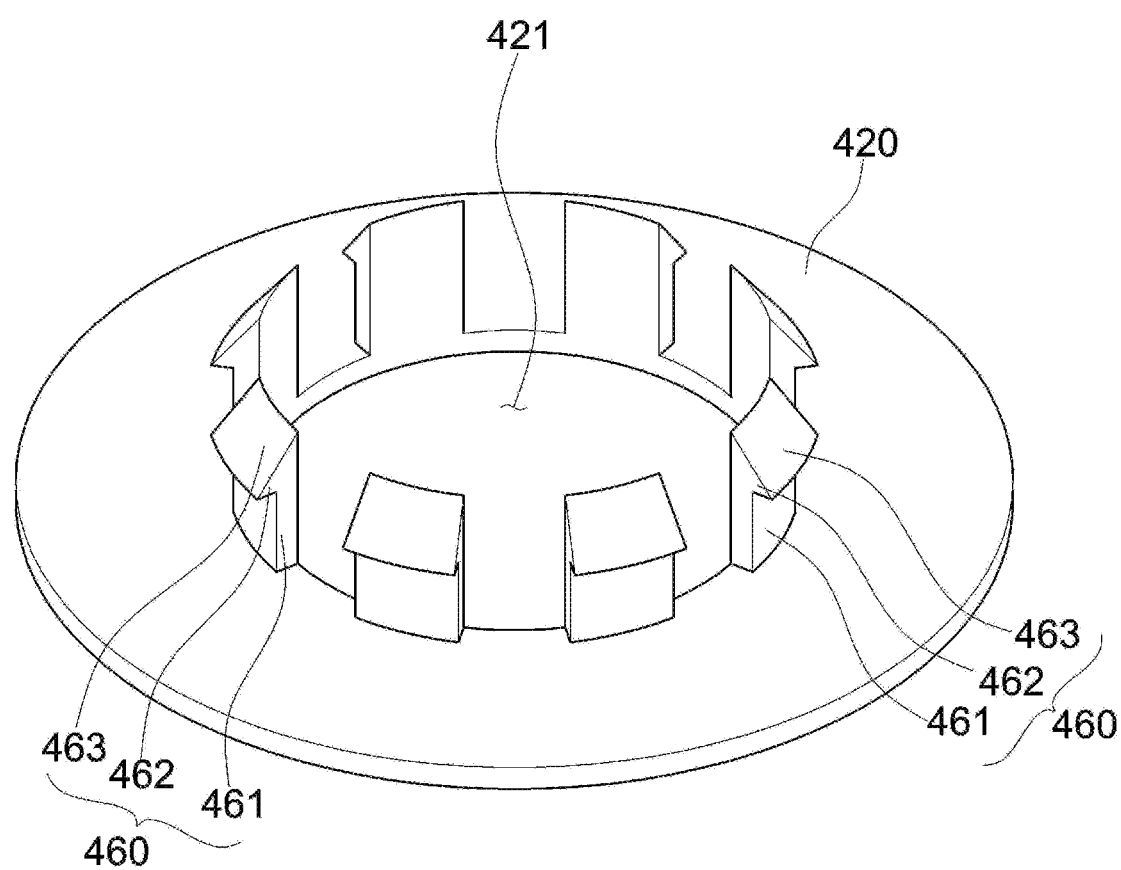
FIG. 3 shows a second body of FIG. 2.

In addition, as shown in FIGS. 2 and 3, the damper 400 according to an embodiment of the present invention may further include a coupling portion 470. The coupling portion 470 may include a first locking portion 450 and a second locking portion 460.

The first locking portion 450 may be formed to protrude toward the buffer member 430 on the first body 410. Specifically, the first locking portion 450 may be formed on the first body 410 to protrude in a direction parallel to the center of the first through hole 411. The first locking portion 450 may be disposed relatively adjacent to the first through hole 411 than the outer peripheral surface of the first body 410.

The second locking portion 460 may be formed to protrude toward the buffer member 430 on the second body 420. In addition, the second locking portion 460 may be formed on the second body 420 to protrude toward the first locking portion 450 so as to be engaged with the first locking portion 450 in a direction parallel to the center of the second through hole 421. Specifically, the second locking portion 460 may be disposed relatively adjacent to the second through hole 421 than the outer peripheral surface of the second body 420.

Accordingly, in the damper 400 according to an embodiment of the present invention, the first body 410 and the second body 420 may be coupled to each other by the coupling portion 470, so that it is possible to effectively maintain the coupling between the first body 410 and the second body 420 and the buffer member 430.

In addition, in the damper 400, the first body 410 and the second body 420 can be coupled by the coupling portion 470. Therefore, the conventional process (insert process) of forming a louver and a washer integrally through an injection mold after the washer manufacturing is unnecessary, so that the manufacturing process of the damper can be reduced.

Also, even when the size of the bearing 200 is changed by the coupling portion 470, it is possible to easily respond to the change only by changing the shapes of the first body 410 and the second body 420.

In addition, the first locking portion 450 according to an embodiment of the present invention may include a first support member 451 and a first protrusion 452.

The first support member 451 may be formed in a direction parallel to the central axis of the first through hole 411 toward the buffer member 430. Specifically, one end of the first support member 451 may be formed to protrude in a direction away from one surface of the first body 410.

For example, the outer periphery of the first support member 451 may be disposed to face the inner periphery of the buffer member 430.

The first protrusion 452 may be formed such that a region of the first protrusion 452 on the first support member 451 protrudes toward the center of the first through hole 411. Specifically, a region of the first protrusion 452 on the first support member 451 may protrude in a direction crossing the central axis of the first through hole 411.

In addition, the damper 400 according to an embodiment of the present invention may further include a first inclined portion 453.

The first inclined portion 453 may be formed to be inclined in a direction adjacent to the central axis of the first through hole 411 as the distance between one end of the first support member 451 and the first protrusion 452 goes in a direction adjacent to the first body 410. Specifically, one end of the first support member 451 may be a region on the first support member 451 disposed furthest from the first body 410. In addition, the first locking portion 450 may be disposed relatively adjacent to the first body 410 than one end of the first support member 451.

Figure 4:
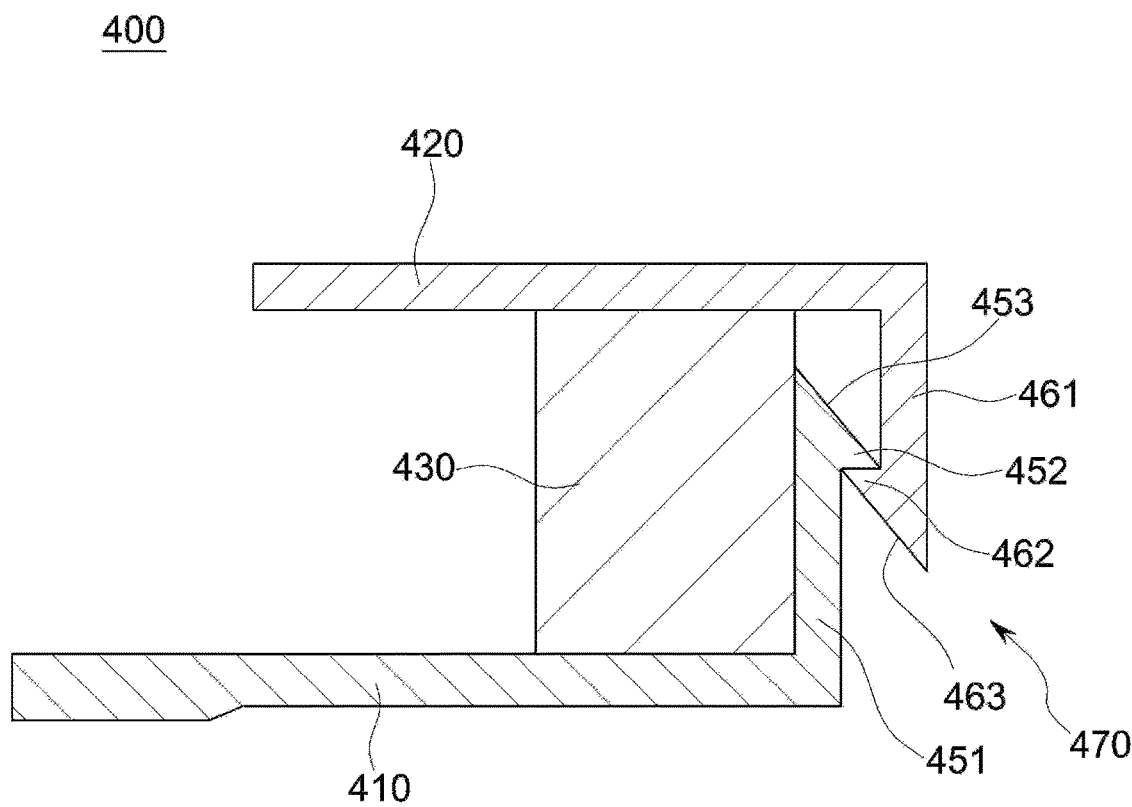
FIG. 4 shows a cross-sectional view of a part of the damper of FIG. 1.

Accordingly, one region of the first locking portion 450 including the first inclined portion 453 and the first protrusion 452 may form, as shown in FIG. 4, about "right triangle" on a longitudinal cross-section of the first body 410.

In addition, the second locking portion 460 according to an embodiment of the present invention may include a second support member 461 and a second protrusion 462.

The second support member 461 may be formed to protrude toward the buffer member 430 in a direction parallel to the central axis of the second through hole 421. Specifically, one end of the second support member 461 may be formed to protrude in a direction away from one surface of the second body 420.

For example, the protrusion directions of the second support member 461 and the first support member 451 may be opposite to each other.

The second protrusion 462 may be formed such that a region of the second protrusion 462 on the second support member 461 protrudes in a direction away from the center of the second through hole 421. Also, the region of the second protrusion 462 on the second support member 461 may protrude toward the outer peripheral surface of the second body 420. Specifically, the second protrusion 462 may be formed so that a region of the second protrusion 462 on the second support member 461 protrudes in a direction away from the central axis of the second through hole 421. That is, the protrusion direction of the second protrusion 462 and the protrusion direction of the first protrusion 452 may be opposite to each other.

In addition, the second protrusion 462 may be formed to engage the first protrusion 452.

In addition, the damper 400 according to an embodiment of the present invention may further include a second inclined portion 463.

The second inclined portion 463 may be formed to be inclined in a direction away from the center axis of the second through hole 421 as the distance between one end of the second support member 461 and the second protrusion 462 goes in a direction adjacent to the second body 420. Specifically, one end of the second support member 461 may be a region on the second support member 461 disposed furthest from the second body 420. Also, the second locking portion 460 may be disposed relatively adjacent to the second body 420 than one end of the first support member 451.

Accordingly, one region of the second locking portion 460 including the second inclined portion 463 and the second protrusion 462 may form, as shown in FIG. 4, about "right triangle" on a longitudinal cross-section of the second body 420.

As shown in FIG. 4, the second protrusion 462, whose cross-section corresponds to the base of the right triangle, is caught and engaged to face the first protrusion 452, whose cross-section corresponds to the base of the right triangle, so that the first body 410 and the second body 420 may maintain coupling to each other.

In addition, in the damper 400 according to an embodiment of the present invention, a plurality of first support members 451 may be disposed on the first body 410 to be spaced apart from each other around the first through hole 411.

The plurality of first support members 451 may be disposed on one surface of the first body 410 to be radially spaced apart from each other around the first through hole 411. Accordingly, the first protrusion 452 may be formed on each of the first support members 451.

In addition, in the damper 400 according to an embodiment of the present invention, a plurality of second support members 461 may be disposed on the second body 420 to be spaced apart from each other around the second through hole 421.

The plurality of second support members 461 may be disposed on one surface of the first body 410 to be radially spaced apart from each other around the second through hole 421. In addition, the second protrusion 462 may be formed on each of the second support members 461. In addition, the second protrusion 462 may be formed in the same number as the number of the first protrusion 452 to be engaged with the first protrusion 452.

In addition, in the damper 400 according to an embodiment of the present invention, one end of the first support member 451 may be disposed to be spaced apart from the second body 420.

One end of the first support member 451 may be spaced apart from the second body 420 supporting the side surface of the buffer member 430 in the center direction of the first through hole 411. Therefore, it is possible to effectively prevent the noise generated by the contact between one end of the first support member 451 and the second body 420 due to the change of the buffer member 430.

In addition, in the damper 400 according to an embodiment of the present invention, the length of the buffer member 430 may be formed to be relatively longer than the length of the first support member 451.

The length of the buffer member 430 may be in a direction parallel to the length direction of the first through hole 411 or the worm shaft 300.

The length of the first support member 451 may be from the first body 410 to one end protruding from the first body 410. Specifically, the length of the first support member 451 may be in a direction parallel to the length direction of the first through hole 411 or the worm shaft 300.

Accordingly, the length of the buffer member 430 is formed to be relatively longer than the length of the first support member 451, so that it is possible to effectively prevent a collision between one end of the first support member 451 and the second body 420 supporting the side surface of the buffer member 430.

In addition, the outer diameter of the second body 420 according to an embodiment of the present invention may be formed to be relatively smaller than the outer diameter of the first body 410.

The outer diameter of the first body 410 is formed relatively larger than the outer diameter of the second body 420, so that the other surface of the first body 410 adjacent to the outer diameter of the first body 410 may be disposed to face the outer ring of the bearing 200.

In addition, in the damper 400 according to an embodiment of the present invention, the outer periphery of the first support member 451 of the first body 410 is disposed to face the inner periphery of the buffer member 430, and the second support member 461 of the second body 420 moves in a direction closer to the first support member 451, and thus, the second locking portion 460 may be engaged with the first locking portion 450.

The damper 400 according to this embodiment of the present invention can be effectively assembled and manufactured without a separate insert molding process for integrally forming the buffer member and the first body or the second body. Accordingly, a mold required for the insert molding process and time for the process thereof are reduced, thereby effectively reducing the cost for manufacturing the damper 400.

In addition, since the coupling portion 470 of the damper 400 according to an embodiment of the present invention is coupled along the central axis of the first through hole 411 of the first body 410, the central axis of the second through hole 421 of the second body 420, and the longitudinal direction of the worm shaft 300, even when an impact in the direction parallel to it occurs, the impact moves along it and the coupling between the first locking portion 450 and the second locking portion 460 can be effectively maintained.

That is, with the coupling of the first and second locking portions 450 and 460, the buffer member 430 of the damper 400 buffers the impact in the longitudinal direction of the worm shaft 300, and it is possible to effectively prevent the coupling of the first body 410 and the second body 420 and the separation of the buffer member 430 from the first body 410 and the second body 420.

With such a configuration, in the damper 400 installed in the driving unit 101 of a steering device according to an embodiment of the present invention, even if the material and physical properties of the buffer member 430 are variably changed, the buffer member 430 can be easily coupled to the first body 410 and the second body 420.

In addition, if the size of the bearing 200 is changed, the shapes of the first and second bodies 410 and 420 in the damper 400 according to an embodiment of the present invention may be changed in response to such change. That is, there is no need to remanufacture a separate mold for the insert molding.

Hereinafter, the driving unit 101 of a steering device according to an embodiment of the present invention will be described with reference to FIGS. 1 to 4.

As shown in FIG. 1, the driving unit 101 of a steering device includes a housing 100 of the driving unit, the worm shaft 300 on which the worm gear 310 is formed, the bearing 200, and the damper 400. In addition, the driving unit 101 of a steering device provides an auxiliary torque of the steering device so that the steering of the wheel is smoothly controlled when a driver manipulates a steering wheel.

An installation region 110 may be formed in the housing 100 of the driving unit. In addition, the housing 100 of the driving unit may support an electric motor (not shown).

Specifically, one side of the installation region 110 is opened so that the bearing 200, the damper 400, and the worm shaft 300 may be installed.

In the worm shaft 300, one region in which the worm gear 310 is formed is disposed in the installation region 110. In addition, the teeth of the worm gear 310 are disposed to engage with the outer peripheral surface of the worm wheel 150 disposed in the housing 100 of the driving unit. Specifically, the central axis of rotation of the worm gear 310 and the central axis of rotation of the worm wheel 150 may be disposed to cross each other. In addition, the worm gear 310 may be coupled to an electric motor (not shown) to receive rotational force. In addition, the worm shaft 300 includes a region in which the worm gear 310 is formed in the housing 100 of the driving unit, and one end thereof is connected to an electric motor (not shown) and can be rotated.

The bearing 200 may rotatably support one side of the worm shaft 300. Specifically, the inner ring of the bearing 200 may support one side of the worm shaft 300, and the worm shaft may be rotatably supported by the engagement of the worm gear 310 and a worm wheel 150 and the electric motor. In addition, the bearing 200 may support the worm shaft 300 disposed in the installation region 110 to be rotatable. Further, the upper surface of the outer ring of the bearing 200 may be supported on the inner peripheral surface of the installation region 110 of the housing 100 of the driving unit.

One side of the worm shaft 300 supported by the bearing 200 passes through the damper 400. In addition, the damper 400 buffers the impact in the axial direction of the worm shaft 300, thereby reducing the resulting noise generation and improving the lifespan of the driving unit 101 of a steering device. In addition, the damper 400 includes the first body 410, the second body 420, the buffer member 430, and the coupling portion 470.

The first body 410 includes the first through hole 411 formed therein. Also, the first body 410 may be formed in an annular shape. The worm shaft 300 may be disposed through the first through hole 411.

For example, the first body 410 may be disposed to face the bearing 200. Specifically, the other surface of the first body 410 may be disposed to face the side surface of the bearing 200.

The second body 420 includes the second through hole 421 formed therein. In addition, the second body 420 may be formed in an annular shape having an outer diameter that is relatively smaller than the outer diameter of the first body 410. The second through hole 421 may be disposed so that the worm shaft 300 passing through the first through hole 411 passes through.

The buffer member 430 may be disposed between the first body 410 and the second body 420. Also, the buffer member 430 may be disposed between one surface of the first body 410 and one surface of the second body 420. Further, the buffer member 430 is formed to include an elastic material, and it is variable and can buffer the impact. The buffer member 430 may be formed in an annular shape. The worm shaft 300 may be disposed to penetrates therein.

The coupling portion 470 may allow the first body 410 and the second body 420 and the buffer member 430 to be coupled to each other. Specifically, the coupling portion 470 may determine the position of the buffer member 430 disposed between the first body 410 and the second body 420 by coupling the first body 410 and the second body 420 to effectively prevent its separation.

Due to this configuration, in the driving unit 101 of a steering device according to an embodiment of the present invention, the damper 400 includes the coupling portion 470, so that the insert molding process of the conventional damper manufacturing process and a separate mold manufacturing for this are unnecessary. Accordingly, in the driving unit 101 of a steering device according to an embodiment of the present invention, the damper 400 effectively buffers the impact in the longitudinal direction of the worm shaft 300, so that noise generation can be reduced and lifespan can be effectively improved.

Also, the damper 400 of the driving unit 101 of a steering device according to an embodiment of the present invention may be formed to have the same configuration as the damper 400 according to the embodiment of the present invention described above.

In addition, the driving unit 101 of a steering device according to an embodiment of the present invention may further include an auxiliary bearing 600 and an auxiliary damper 700.

The auxiliary bearing 600 may be disposed in the installation region 110 to rotatably support the other side of the worm shaft 300.

In addition, the auxiliary damper 700 may buffer the impact in the axial direction of the worm shaft 300 acting on the auxiliary bearing 600. Specifically, the auxiliary damper 700 may be disposed between the installation region 110 and the auxiliary bearing 600. In addition, the auxiliary damper 700 may be formed with a first auxiliary body 710, a second auxiliary body 720, and an auxiliary buffer member 730.

For example, the auxiliary damper 700 may be formed in the same manner as the above-described damper 400.

Alternatively, the auxiliary damper 700 may be one in which the first auxiliary body 710 and the second auxiliary body 720 formed in a washer and the auxiliary buffer member 730 coupled thereto are manufactured through an insert molding process as in the conventional art.

In addition, the driving unit 101 of a steering device according to an embodiment of the present invention may further include a lock nut 500.

The lock nut 500 covers one open region of the installation region 110 to block foreign substances from the outside of the housing 100 of the driving unit from being introduced into the installation region 110. In addition, the lock nut 500 may prevent the damper 400 and the bearing 200 from moving in the axial direction of the worm shaft 300. In addition, the lock nut 500 may be helically coupled to the housing 100 of the driving unit.

Accordingly, the driving unit 101 of a steering device according to an embodiment of the present invention includes the auxiliary damper 700 and the damper 400, so that it is possible to reduce noise generation by buffering the impact in the axial direction of the worm shaft 300 and to effectively maintain the engagement between the worm wheel 150 and the worm gear 310.

Although the embodiments of the present invention have been described above with reference to the accompanying drawings, those of ordinary skill in the art to which the present invention pertains will be understand that the present invention may be embodied in other specific forms without changing the technical spirit or essential characteristics thereof.

Therefore, the embodiments described above are to be understood as illustrative and not restrictive in all respects, and the scope of the present invention is indicated by the following claims, the meaning and scope of the claims, and all changes or modifications derived from the equivalent concept should be construed as being included in the scope of the present invention.

DESCRIPTION OF REFERENCE NUMERALS

| | | | |
|---|---|---|---|
| 100: | housing | 101: | driving unit of a steering device |
| 110: | installation region | 150: | worm wheel |
| 200: | bearing | 300: | worm shaft |
| 310: | worm gear | | |
| 400: | damper | 410: | first body |
| 411: | first through hole | 420: | second body |
| 421: | second through hole | 430: | buffer member |
| 450: | first locking portion | 460: | second locking portion |
| 451: | first support member | 452: | first protrusion |
| 453: | first inclined portion | 461: | second support member |
| 462: | second protrusion | 463: | second inclined portion |
| 470: | coupling portion | | |

What is claimed is:

1. A damper which is installed in a driving unit of a steering device to buffer an impact of a worm shaft comprising a worm gear formed in one region and a bearing supporting a rotation of the worm shaft, the damper comprising:
    a first body comprising a first through hole formed therein through which the worm shaft passes;
    a second body coupled to the first body and comprising a second through hole through which the worm shaft passing through the first through hole passes; and
    a buffer member disposed between the first body and the second body; and
    a coupling portion comprising a first locking portion protruding toward the buffer member on the first body and a second locking portion formed on the second body to engage the first locking portion,
    wherein the first locking portion comprises:
    a first support member protruding toward the buffer member in a direction parallel to a central axis of the first through hole;
    a first protrusion in which a region on the first support member protrudes toward a center of the first through hole; and
    a first inclined portion formed to be inclined between one end of the first support member and the first protrusion.

2. The damper according to claim 1, wherein the second locking portion comprises:
    a second support member protruding toward the buffer member in a direction parallel to a central axis of the second through hole; and
    a second protrusion in which a region on the second support member protrudes in a direction away from a center of the second through hole and which is engageable with the first protrusion.

3. The damper according to claim 2, wherein the second locking portion further comprises a second inclined portion formed to be inclined between one end of the second support member and the second protrusion.

4. The damper according to claim 1, wherein one end of the first support member is spaced apart from the second body in a center direction of the first through hole.

5. The damper according to claim 1, wherein a length of the buffer member in a direction parallel to a longitudinal direction of the worm shaft is formed to be relatively longer than a length of the first support member from the first body in a direction parallel to a center direction of the first through hole.

6. The damper according to claim 1, wherein an outer diameter of the second body is formed to be relatively smaller than an outer diameter of the first body.

7. A driving unit of a steering device which provides an auxiliary torque of the steering device and comprises a housing of the driving unit comprising an installation region formed therein, the driving unit of the steering device comprising:
a worm shaft disposed in the installation region and comprising a worm gear formed in one region;
a bearing rotatably supporting one side of the worm shaft; and
a damper comprising a first body comprising a first through hole formed therein so that the worm shaft passes through, a second body comprising a second through hole formed so that the worm shaft passing through the first through hole passes through, a buffer member disposed between the first body and the second body, and a coupling portion coupling the first body, the buffer member, and the second body to each other,
wherein the coupling portion comprises:
a first locking portion comprising a first support member protruding toward the buffer member in a direction parallel to a central axis of the first through hole, and a first protrusion in which a region on the first support member protrudes toward a center of the first through hole; and
a second locking portion comprising a second support member protruding toward the buffer member in a direction parallel to a central axis of the second through hole and a second protrusion in which a region on the second support member protrudes in a direction away from a center of the second through hole and which is engageable with the first protrusion.

8. The driving unit of a steering device according to claim 7, wherein the coupling portion is disposed so that an inner peripheral surface of the buffer member faces an outer periphery of the first support member.

9. The driving unit of a steering device according to claim 7, wherein a plurality of the first support members is disposed on the first body to be spaced apart from each other about the first through hole.

10. The driving unit of a steering device according to claim 7, wherein a plurality of the second support members is disposed on the second body to be spaced apart from each other around the second through hole.

11. The driving unit of a steering device according to claim 7, wherein in the coupling portion, the second protrusion is caught and engaged with the first locking portion in a direction parallel to a center of the first through hole.

12. The driving unit of a steering device according to claim 11, wherein the coupling portion maintains the coupling between the first body, the second body, and the buffer member even if the buffer member is varied in a direction parallel to a longitudinal direction of an axial direction of the worm shaft.

13. A damper which is installed in a driving unit of a steering device to buffer an impact of a worm shaft comprising a worm gear formed in one region and a bearing supporting a rotation of the worm shaft, the damper comprising:
a first body comprising a first through hole formed therein through which the worm shaft passes;
a second body coupled to the first body and comprising a second through hole through which the worm shaft passing through the first through hole passes;
a buffer member disposed between the first body and the second body; and
a coupling portion comprising a first locking portion protruding toward the buffer member on the first body and a second locking portion formed on the second body to engage the first locking portion,
wherein the first locking portion comprises:
a first support member protruding toward the buffer member in a direction parallel to a central axis of the first through hole; and
a first protrusion in which a region on the first support member protrudes toward a center of the first through hole,
wherein the second locking portion comprises:
a second support member protruding toward the buffer member in a direction parallel to a central axis of the second through hole; and
a second protrusion in which a region on the second support member protrudes in a direction away from a center of the second through hole and which is engageable with the first protrusion.

14. The damper according to claim 13, wherein the first locking portion further comprises a first inclined portion formed to be inclined between one end of the first support member and the first protrusion.

15. The damper according to claim 13, wherein the second locking portion further comprises a second inclined portion formed to be inclined between one end of the second support member and the second protrusion.

16. The damper according to claim 13, wherein one end of the first support member is spaced apart from the second body in a center direction of the first through hole.

17. The damper according to claim 13, wherein a length of the buffer member in a direction parallel to a longitudinal direction of the worm shaft is formed to be relatively longer than a length of the first support member from the first body in a direction parallel to a center direction of the first through hole.

* * * * *